(12) United States Patent  
Deptolla

(10) Patent No.: US 7,434,883 B2
(45) Date of Patent: Oct. 14, 2008

(54) VEHICLE SEAT

(75) Inventor: Bernd Deptolla, Niedernwohren (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 11/034,548

(22) Filed: Jan. 13, 2005

(65) Prior Publication Data

US 2005/0156455 A1    Jul. 21, 2005

(30) Foreign Application Priority Data

Jan. 20, 2004    (DE) .................. 10 2004 002 728

(51) Int. Cl.
*B60N 2/00* (2006.01)
*A47C 9/06* (2006.01)

(52) U.S. Cl. ................... 297/341; 297/340; 297/378.1; 297/378.12; 297/15

(58) Field of Classification Search ............ 297/344.12, 297/344.11, 378.12, 378.14, 341, 340, 15, 297/378.1; 248/429, 430; 296/65.16
See application file for complete search history.

(56) References Cited

U.S. PATENT DOCUMENTS

| | | | | |
|---|---|---|---|---|
| 4,065,178 A | * | 12/1977 | Carella et al. | ............... 297/341 |
| 4,822,101 A | * | 4/1989 | Hosoe | ................... 297/378.12 |
| 5,683,140 A | * | 11/1997 | Roth et al. | ............... 297/344.1 |
| 6,102,478 A | * | 8/2000 | Christopher | ................ 297/341 |
| 6,152,533 A | * | 11/2000 | Smuk | ......................... 297/341 |
| 6,371,558 B1 | * | 4/2002 | Couasnon | ................ 297/378.1 |

FOREIGN PATENT DOCUMENTS

| | | |
|---|---|---|
| DE | 198 82 413 T1 | 3/1998 |
| DE | 100 43 404 C2 | 4/2003 |
| WO | WO 99/38723 | 5/1999 |

* cited by examiner

*Primary Examiner*—David R Dunn
*Assistant Examiner*—Erika Garrett
(74) *Attorney, Agent, or Firm*—Richard C. Woodbridge; Synnestvedt & Lecher LLP

(57) ABSTRACT

The invention relates to a vehicle seat with a seat frame (3) with upper rails (5) that are adjustable on vehicle-integrated upper rails (6) in the longitudinal direction and a backrest (8) that is locked on a seat frame-integrated component (4) using inclination adjusters, wherein the vehicle seat (1) can be moved from a utilization position into an easy-entry position by folding the backrest (8) forward into a partially forward-folded position and longitudinal movement of the seat frame (3) from a utilization zone forward into and easy-entry zone.

According to the invention, it is proposed that the backrest (8) has a latching arrangement (32) for its partial forward-folded position, a latching mechanism (9) is provided on the seat frame (3), which is automatically adjustable as a factor of the longitudinal position of the seat frame (3) and assumes in the rear utilization zone a release position and in the forward easy-entry zone a latching position, in which it locks with the latching arrangement (32) of the backrest (8) and can be released from the latching arrangement (32) only by a movement of the seat frame (3) rearward out of the easy-entry zone into the utilization zone.

9 Claims, 4 Drawing Sheets

VEHICLE SEAT

CROSS REFERENCE TO RELATED APPLICATIONS

This application claims the priority of German Patent Application 10 2004 002 728.5 filed on Jan. 20, 2004, the entire contents of which is hereby incorporated in total by reference.

BACKGROUND OF THE INVENTION

1. Field of the Invention

The invention relates to an adjustable motor vehicle seat.

2. Description of Related Art

This type of vehicle seat is well-known from DE 198 82 413 T1. It is adjustable between a utility position with an essentially upright or somewhat rearward inclined backrest and an easy-entry-position that facilitates easy entry to the rear seat when the backrest is partially folded forward and longitudinally adjustable seat frame moved forward. To do this, there is an unlatching of an inclination adjuster between the backrest and the seat frame using an upper operating lever.

DE 100 43 404 C2 shows a vehicle seat with a locking device for a foldable backrest, which can be folded forward into an easy-entry-position and can be locked in that position, in that a rest-side locking projection engages in a slot zone of a counter element, which in turn is connected with the backrest via a spring. When folding the backrest forward the roller engages in the slot zone and prevents further folding forward.

WO 99/38723 A1 discloses a vehicle seat, which can be adjusted to an easy-entry-position and a cargo position using two handles arranged in the upper zone of its backrest. When this is done, in the easy-entry-position, the backrest is partially folded forward.

To adjust the vehicle seat longitudinally, generally upper rails integral with the seat frame are provided, which slide on the lower rails that are integral with the vehicle. Due to stability considerations an overlapping of upper and lower rails in the useful zone are required with a certain minimum length. Upon further movement of the seat in the forward direction for comfortable entry to the rear seats, the rail cover is reduced, whereby the reduced rail covering is sufficient for carrying the empty seat; the seat in that position, however, cannot be used by a user when traveling.

However, the vehicle seats mentioned at the introduction have only a minimum security against unintended use of the vehicle seat in the easy-entry-position. In some vehicle seats the user can pivot the backrest in the easy-entry-position rearward by operating the handle, so that a user in principal has enough space on the seat not in the proper use position between the backrest pivoted back and a front seat or the steering wheel. Accordingly, an improper utilization while driving can occur. The latches also, as disclosed in DE 100 43 404 C2, for example, cannot permit any complete locking of the backrest in the folded forward position, so that the user can fold the backrest rearward in the event of incorrect operation by increased application of force.

SUMMARY OF THE INVENTION

The object of the invention is to at least extensively prevent or make difficult unintended use of the vehicle seat in the easy-entry-position.

According to the invention, in the easy-entry position, in which the seat frame is displaced forward and the backrest is partially folded forward, a rearward folding of the backrest is prevented by a latching means fastened to the seat frame and a locking configured on the backrest. When this is done, the latching mechanism is automatically displaced as a factor of the longitudinal position of the seat frame, wherein it, in the rear utilization zone of the seat frame, assumes a release position and in the forward easy-entry-zone of the seat frame reliably assumes an arrest position or a latching position without the possibility of unintentional operation.

The latching mechanism can have a contact means—a roller, for example—, which in the utilization zone is urged against a counter part integral with the vehicle—a rail, for example—and moves freely in he forward easy-entry-position or is out of contact with the counter part integral with the vehicle. When the contact means reaches the forward easy-entry-position, by releasing spring creating the pre-stressing of the latching means of the latching mechanism—a latching head or a contact lever kinematically connected with the contact means, for example—, moves into the latch of the back rest. In principle, however, a reverse configuration is possible according to the invention, wherein a contact means in the easy-entry-zone contact against a counter part integral with the vehicle and in the utilization zone is out of contact, whereby the latching means in the utilization zone is moved out of the catch arrangement.

Advantageously, in the forward easy-entry-zone no latching of the longitudinal adjusting arrangement is provided.

The invention will now be explained using an embodiment with reference to the attached drawings, wherein:

DETAILED DESCRIPTION OF THE INVENTION

Figure 1:
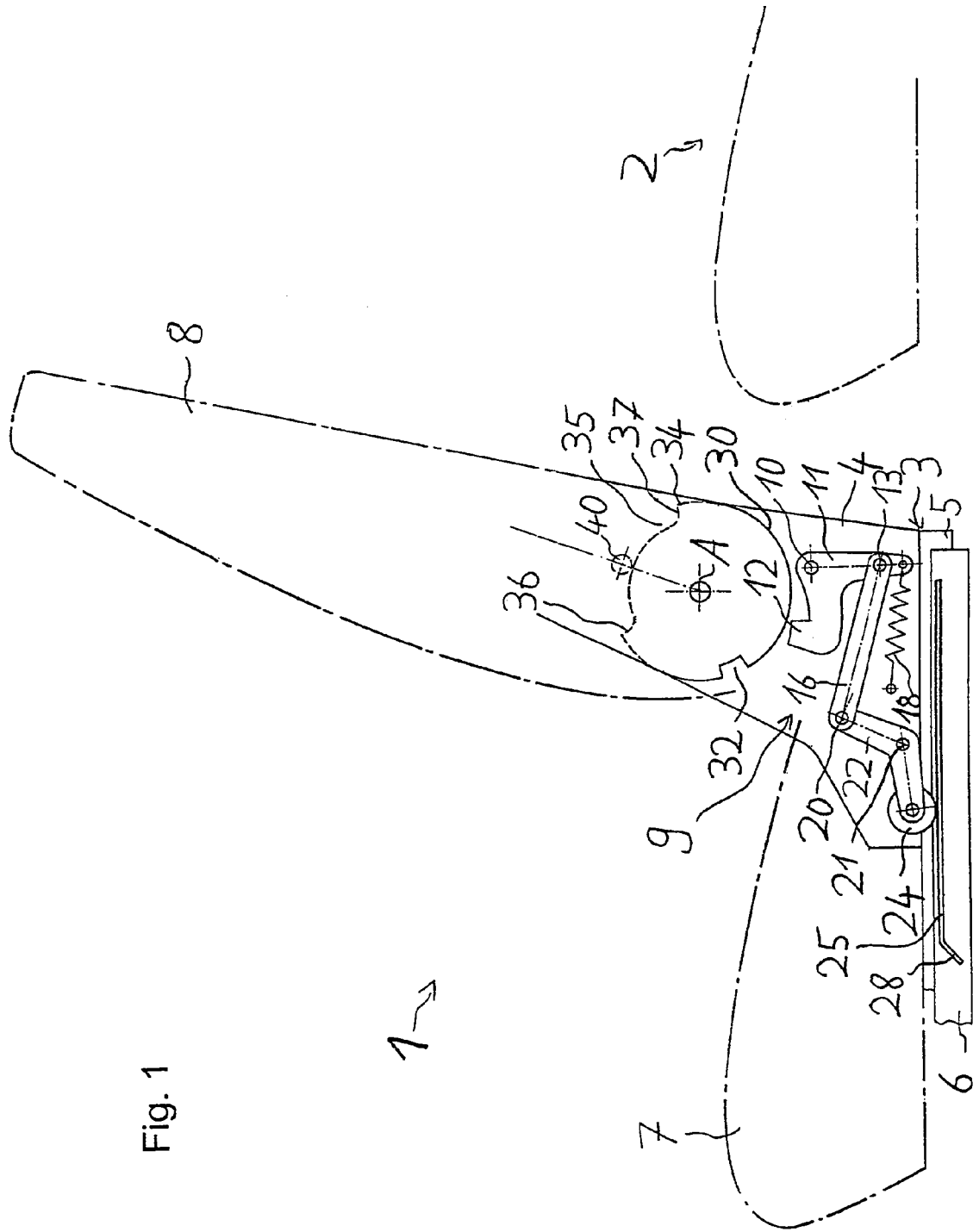
FIG. 1 a longitudinal section through a vehicle seat according to the invention in the utilization position.

A vehicle seat 1 of the first or second row of a vehicle is (in the direction of travel) arranged in front of another vehicle seat 2. The rear vehicle seat 2 is reached by the user through the same door as that of vehicle seat 1, which must be appropriately moved to allow this.

The vehicle seat 1 has a seat frame 3 with an adapter element 4 and an upper rail 5, which moves longitudinally within a rear utilization zone on a lower rail 6 that is integrated with the vehicle and can be arrested and in addition can be adjusted in a forward easy-entry-zone.

In addition, the vehicle seat 1 has a seat cushion 7 and a backrest 8 that is foldable on an adapter 4 on a rest pivot axis A. The backrest 8 is arrested on the adapter 4 using inclination adjusters, which are operated by the user sitting on the seat cushion 7 by means of an operating lever arranged in the bottom zone of the backrest 8, so that the user can urge the inclination of the backrest 8 to the rear against a spring force, for example, with his back.

In the utilization position of the vehicle seat 1 represented in FIG. 1, the seat frame 3 is in a rearward utilization zone relative to the direction travel, within which the seat can be adjusted by the user seated on the seat cushion 7.

In addition, a handle (not shown in the drawings) is provided in the upper zone of the backrest 8, using which the inclination adjusters of the backrest 8 and advantageously combined therewith the longitudinal locking of the top rail 5 on the bottom rail can be effected.

Figure 1A:
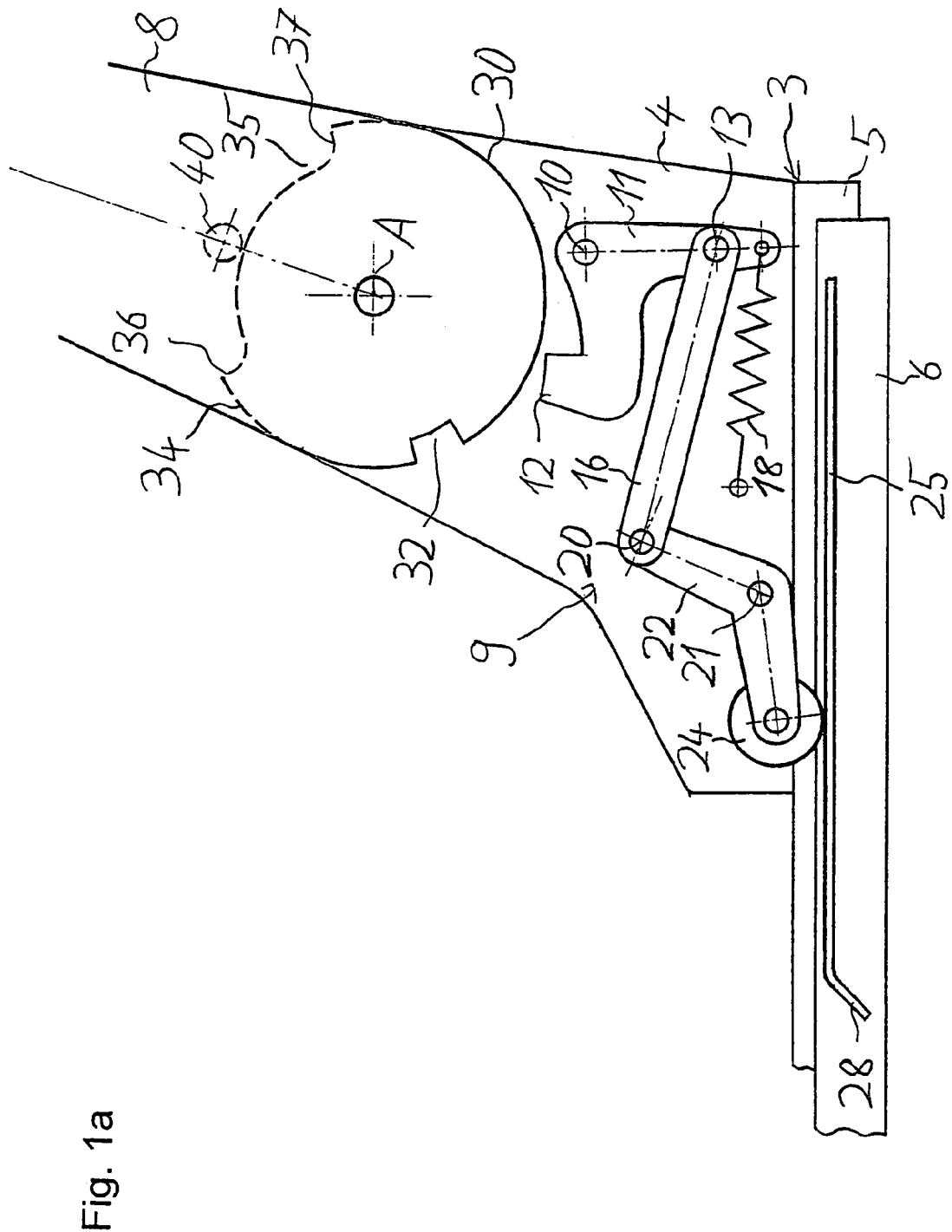
FIG. 1a an enlargement of a section of FIG. 1 with the latching mechanism.

A latching mechanism 9 is applied to the adapter 4, said latching mechanism, upon longitudinal moving of the seat frame 3 from the utilization position shown in FIG. 1, 1a into the easy-entry-position shown in 2, 2a, automatically moves from a release position into the latching position. The latching mechanism 9 has a latching lever 11 articulated with a pivot bearing 10, which has an essentially upward facing latch head 12 at its upper lever arm and is connected at its lower lever arm in a connection point 13 using a bar 16, which serves as a transition part. In addition, a traction spring 15 engages at the lower lever arm of the latch lever 11, said latch lever 11, which biases the latch lever 1 in the latching position of FIG. 2, 2a. The front end of the bar 16 is articulated in an articulation point 20 on the upper arm of contact lever 22 connected in a pivot bearing 21 on the adapter 4. A roller 24 is mounted at the front end of the front lever arm of the contact lever 22, said roller being urged by the bias effected by spring 18, by means of attached lower rail 6 onto a bar 25 that extends longitudinally within the utilization zone and upon longitudinal movement of the seat frame 3 rolls onto same. The bar 25 that is integral with the vehicle has at its front end a downwardly inclined bevel 28 transitioning into the easy-entry zone.

At an essentially circular forming lower external contour 30 of the backrest 8 or its rest frame, a latching element 32 is configured as a radial recess for receiving latching head 12 in the easy-entry position.

In the upper zone of the adapter 4 and in its outer contour 34 a recess 35 is formed, in which a bolt 40, fastened to the backrest 8 or its rest frame and projecting diagonally, pivots freely. The recess 35 is delimited by a front easy-entry stop 36 and a rear stop 37 defining the rear end of the comfort zone and defines the pivot range of the backrest 8.

In the utilization position of FIG. 1, the spring 18 presses the contact lever 22 with its roller 24 onto the bar 25, whereby a further pivoting of the latch lever 11 is blocked. The latch head 12 of the latch lever 11 thus does not engage with the latching arrangement 32 of the backrest 8, so that the latter, after loosening the inclination adjusters, can be pivoted within the pivot range defined by the stops 36, 37.

Figure 2:
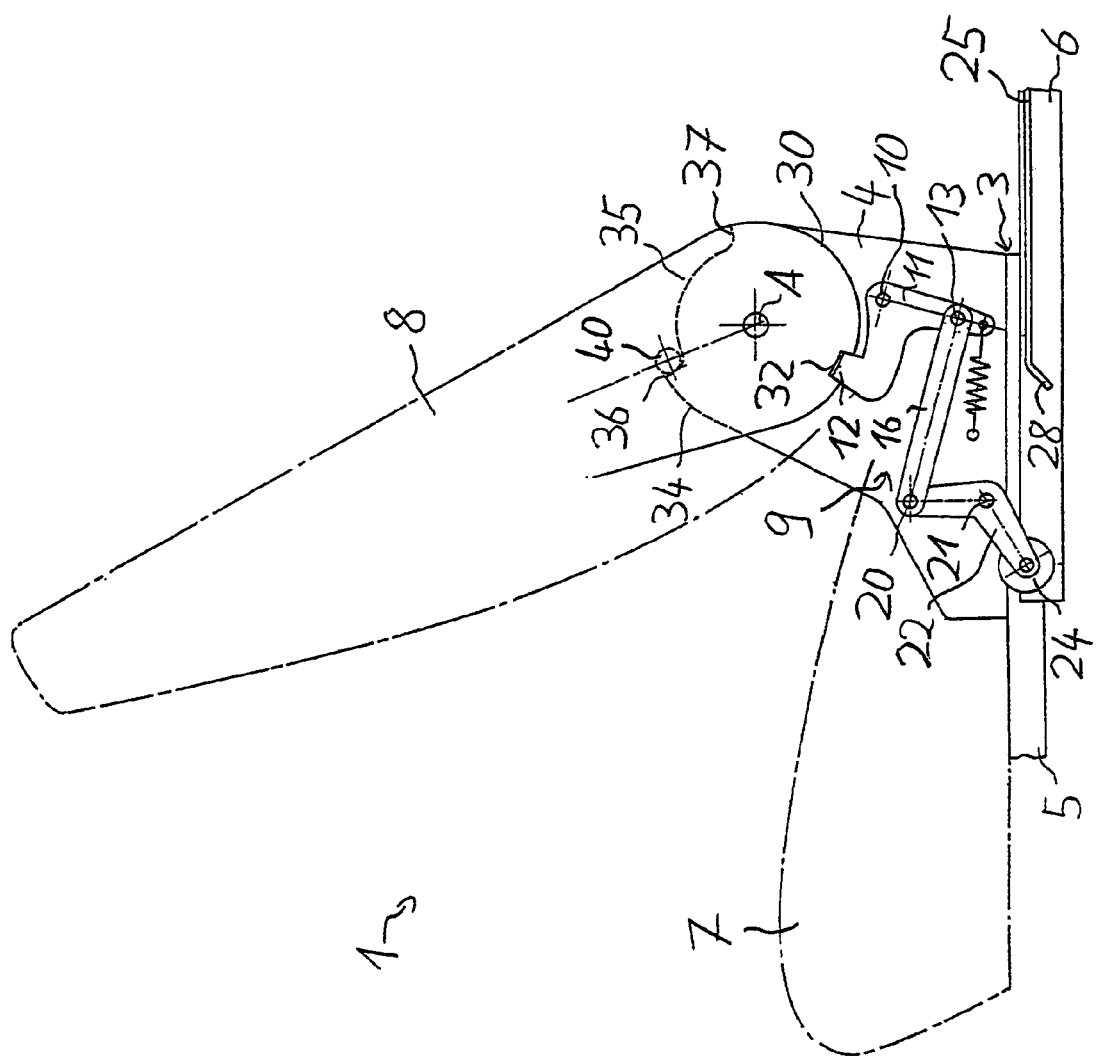
FIG. 2 a representation corresponding to FIG. 1 in the easy-entry-position of the vehicle seat with a seat frame moved longitudinally and backrest partially folded forward.
Figure 2A:
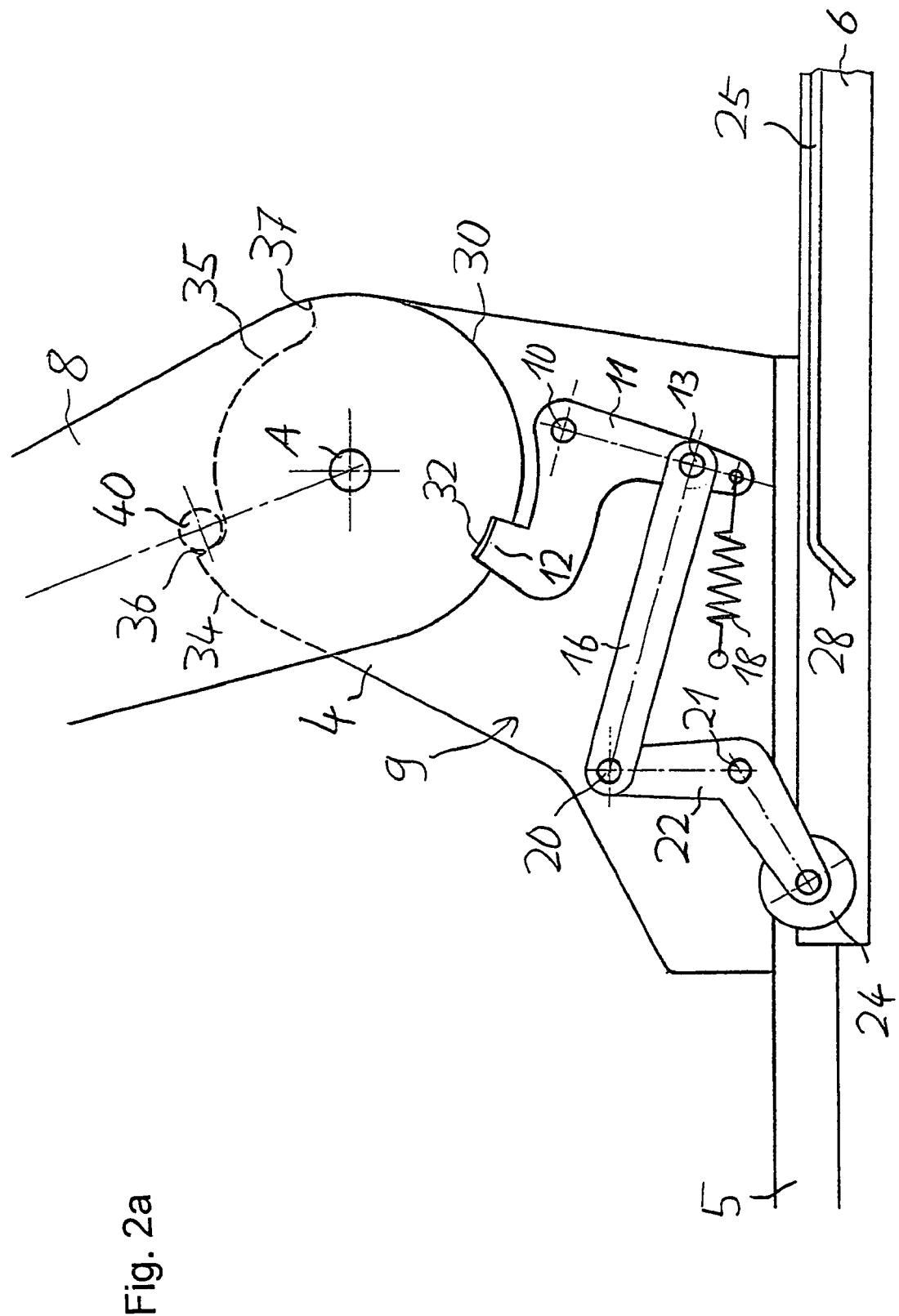
FIG. 2a an enlargement of a section of FIG. 2 with the latching mechanism.

Upon adjusting the vehicle seat 1 in the easy-entry position of FIG. 2, 2a, the user loosens the inclination adjusters using the operating lever in upper zone of the backrest 8 and first folds the backrest 8 forward until the backrest-integrated bolt 40 contacts the front stop 36. Then, with the same movement, the user can move the vehicle seat 1 on the lower rail 6 longitudinally forward over the utilization zone. When this is done, the roller 24 moves from the bar 25 over its bevel downward while de-stressing the spring 18. The spring 18 consequently draws the latch lever 11, so that its latch head 12 pivots upwards into the latching arrangement 32.

A pivoting movement of the backrest 8 and consequently also a folding back of the backrest 8 from the easy-entry position of FIG. 2 is consequently positively blocked, so that the user, in order to fold back the backrest, must first move the vehicle seat 1 longitudinally from the easy-entry position back into the comfort zone. Hereby the roller 24 moves against the bevel 28 of the bar 25, is raised with the further rearward movement and subsequently slides onto the bar 25. Accordingly, the bevel 28 is used for aligning the rearward moving roller 24. Accordingly, the latch lever 11 is pivoted counterclockwise about its pivot bearing 10, so that the latch head 12 comes out of the latching arrangement 32 and releases the backrest 8.

While the invention has been described with reference to the preferred embodiment thereof, it will be appreciated by those of ordinary skill in the art that modifications can be made to the parts that comprise the invention without departing from the spirit and scope thereof.

The invention claimed is:

1. A vehicle seat with
   a seat frame (3) with an upper rail (5), which can be displaced on a vehicle-integral lower rail (6) in the longitudinal direction,
   and
   a backrest (8) articulated in a rest axis (A) locking on a component (4) that is integrated with the seat by means of inclination adjusters,
   whereby the vehicle seat (1) can be moved from a utilization position into an easy-access position by folding the backrest (8) forward into a partially forward-folded position and moving the seat frame (3) longitudinally from a utilization position forward into an easy-entry zone,
   characterized in that
   the backrest (8) has a latching arrangement (32) for its partial forward-folded position into the easy-entry portion, a latch mechanism (9) is provided on the seat frame (3), which as a factor of the longitudinal position of the seat frame (3) is automatically adjustable, so that it assumes in the rear utilization zone of the seat frame (3) a release position and in the forward easy-entry zone of the seat frame (3) a latching position, in which it latches with the latching arrangement (32) of the backrest (8), and
   the latching mechanism (9) can be released from the latching arrangement (32) of the backrest (8) only by a movement of the seat frame (3) rearward from the easy-entry zone into the utilization zone,
   wherein the latching mechanism (9) has a contact part (24), which abuts in the rear utilization zone of the seat frame (3) on a vehicle-integrated counter element (25) and is released in the forward easy-entry zone of the seat frame (3),
   wherein the contact part (24) in the release portion is biased against the vehicle-integrated counter element (25) and a latching means (12) of the latching mechanism (9) is out of engagement of the latching arrangement, and in the forward easy-entry zone of the seat frame (3) the contact part (24) is displaced under the action of de-stressing the spring (18) and hereby the latching means (12) engages in the latching arrangement (32) of the backrest (8) in its forward-folding position.

2. The vehicle seat according to claim 1, wherein the latching mechanism (9) has a latch leer (11) that is articulated on the seat frame-integrated component (4) and a contact lever (22), which is articulated on the vehicle-integrated component (4), that is kinematically connected therewith and presses the contact part (24) against the vehicle-integrated counter element (25).

3. The vehicle seat according to claim 2, wherein the seat-integrated counter element (25) is a bar (25) extending longitudinally and the contact part (24) is a roller (24) rolling on the bar (25).

4. The vehicle seat according to claim 3, wherein the bar (25) has a forward and downwardly oriented bevel (28) at its front end, said bevel receiving the released roller (24) upon the rearward movement of the seat frame (3) into the utilization zone.

5. The vehicle seat according to claim 1, wherein the seat-integrated counter element (25) is a bar (25) extending longitudinally and the contact part (24) is a roller (24) rolling on the bar (25).

6. A vehicle seat with
a seat frame (3) with an upper rail (5), which can be displaced on a vehicle-integral lower rail (6) in the longitudinal direction,
and
a backrest (8) articulated in a rest axis (A) locking on a component (4) that is integrated with the seat by means of inclination adjusters,
whereby the vehicle seat (1) can be moved from a utilization position into an easy-access position by folding the backrest (8) forward into a partially forward-folded position and moving the seat frame (3) longitudinally from a utilization position forward into an easy-entry zone,
characterized in that
the backrest (8) has a latching arrangement (32) for its partial forward-folded position into the easy-entry portion, a latch mechanism (9) is provided on the seat frame (3), which as a factor of the longitudinal position of the seat frame (3) is automatically adjustable, so that it assumes in the rear utilization zone of the seat frame (3) a release position and in the forward easy-entry zone of the seat frame (3) a latching position, in which it latches with the latching arrangement (32) of the backrest (8), and
the latching mechanism (9) can be released from the latching arrangement (32) of the backrest (8) only by a movement of the seat frame (3) rearward from the easy-entry zone into the utilization zone,
wherein a recess (35) is formed in the vehicle-integrated component (4), into which a rest-integrated bolt (40) pivots freely between the stops (36, 37).

7. The vehicle seat according to claim 6, wherein the seat-integrated counter element (25) is a bar (25) extending longitudinally and the contact part (24) is a roller (24) rolling on the bar (25).

8. A vehicle seat with
a seat frame (3) with an upper rail (5), which can be displaced on a vehicle-integral lower rail (6) in the longitudinal direction,
and
a backrest (8) articulated in a rest axis (A) locking on a component (4) that is integrated with the seat by means of inclination adjusters,
whereby the vehicle seat (1) can be moved from a utilization position into an easy-access position by folding the backrest (8) forward into a partially forward-folded position and moving the seat frame (3) longitudinally from a utilization position forward into an easy-entry zone,
characterized in that
the backrest (8) has a latching arrangement (32) for its partial forward-folded position into the easy-entry portion, a latch mechanism (9) is provided on the seat frame (3), which as a factor of the longitudinal position of the seat frame (3) is automatically adjustable, so that it assumes in the rear utilization zone of the seat frame (3) a release position and in the forward easy-entry zone of the seat frame (3) a latching position, in which it latches with the latching arrangement (32) of the backrest (8), and
the latching mechanism (9) can be released from the latching arrangement (32) of the backrest (8) only by a movement of the seat frame (3) rearward from the easy-entry zone into the utilization zone,
wherein the latching mechanism (9) has a contact part (24), which abuts in the rear utilization zone of the seat frame (3) on a vehicle-integrated counter element (25) and is released in the forward easy-entry zone of the seat frame (3),
wherein the latching mechanism (9) has a latch leer (11) that is articulated on the seat frame-integrated component (4) and a contact lever (22), which is articulated on the vehicle-integrated component (4), that is kinematically connected therewith and presses the contact part (24) against the vehicle-integrated counter element (25).

9. A vehicle seat with
a seat frame (3) with an upper rail (5), which can be displaced on a vehicle-integral lower rail (6) in the longitudinal direction,
and
a backrest (8) articulated in a rest axis (A) locking on a component (4) that is integrated with the seat by means of inclination adjusters,
whereby the vehicle seat (1) can be moved from a utilization position into an easy-access position by folding the backrest (8) forward into a partially forward-folded position and moving the seat frame (3) longitudinally from a utilization position forward into an easy-entry zone,
characterized in that
the backrest (8) has a latching arrangement (32) for its partial forward-folded position into the easy-entry portion, a latch mechanism (9) is provided on the seat frame (3), which as a factor of the longitudinal position of the seat frame (3) is automatically adjustable, so that it assumes in the rear utilization zone of the seat frame (3) a release position and in the forward easy-entry zone of the seat frame (3) a latching position, in which it latches with the latching arrangement (32) of the backrest (8), and
the latching mechanism (9) can be released from the latching arrangement (32) of the backrest (8) only by a movement of the seat frame (3) rearward from the easy-entry zone into the utilization zone,
wherein the latching mechanism (9) has a contact part (24), which abuts in the rear utilization zone of the seat frame (3) on a vehicle-integrated counter element (25) and is released in the forward easy-entry zone of the seat frame (3),
wherein the seat-integrated counter element (25) is a bar (25) extending longitudinally and the contact part (24) is a roller (24) rolling on the bar (25).

* * * * *